(12) United States Patent
Patel et al.

(10) Patent No.: US 7,370,348 B1
(45) Date of Patent: May 6, 2008

(54) TECHNIQUE AND APPARATUS FOR PROCESSING CRYPTOGRAPHIC SERVICES OF DATA IN A NETWORK SYSTEM

(75) Inventors: Baiju V. Patel, Portland, OR (US); Uri Elzur, Zichron Yaakov (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/364,835

(22) Filed: Jul. 30, 1999

(51) Int. Cl.
G06F 7/04 (2006.01)
(52) U.S. Cl. .......................................... 726/5; 713/150
(58) Field of Classification Search ........ 713/200–201, 713/202, 160, 166, 161, 165, 176; 705/64; 380/201, 229, 239, 42, 277–285, 243, 247, 380/251, 255, 258, 37, 282, 28–30; 709/229
See application file for complete search history.

(56) References Cited

U.S. PATENT DOCUMENTS

| | | | |
|---|---|---|---|
| 5,228,083 A | | 7/1993 | Lozowick et al. |
| 5,268,962 A | * | 12/1993 | Abadi et al. ............... 713/161 |
| 5,546,463 A | * | 8/1996 | Caputo et al. .............. 713/159 |
| 5,671,285 A | * | 9/1997 | Newman ..................... 705/78 |
| 5,896,507 A | * | 4/1999 | Martineau ................... 709/216 |
| 6,047,176 A | * | 4/2000 | Sakamoto et al. ............ 455/22 |
| 6,061,449 A | * | 5/2000 | Candelore et al. ............ 380/28 |
| 6,081,895 A | | 6/2000 | Harrison et al. |
| 6,087,955 A | * | 7/2000 | Gray ........................ 340/5.74 |
| 6,227,445 B1 | * | 5/2001 | Brookner ................... 235/379 |
| 6,230,002 B1 | * | 5/2001 | Floden et al. ............... 455/411 |
| 6,253,321 B1 | * | 6/2001 | Nikander et al. ........... 713/160 |
| 6,304,973 B1 | * | 10/2001 | Williams .................... 713/201 |
| 6,308,227 B1 | * | 10/2001 | Kumar et al. ................ 710/4 |
| 6,367,017 B1 | * | 4/2002 | Gray ........................ 713/200 |
| 6,446,210 B1 | * | 9/2002 | Borza ........................ 713/201 |
| 6,453,345 B2 | * | 9/2002 | Trcka et al. ................ 709/224 |
| 6,484,318 B1 | * | 11/2002 | Shioda et al. .............. 725/110 |
| 6,493,338 B1 | * | 12/2002 | Preston et al. .............. 370/352 |

(Continued)

FOREIGN PATENT DOCUMENTS

EP 0 876 026 11/1998
JP 5-199220 8/1993

OTHER PUBLICATIONS

D. Maughan et al., *Internet Security Association and Key Management Protocol (ISAKMP)*, pp. 1-86, printed from web site http://sunsite.auc.dk/RFC/rfc/rfc2408.html, (Nov. 1998).

(Continued)

*Primary Examiner*—Kim Vu
*Assistant Examiner*—Leynna Ha
(74) *Attorney, Agent, or Firm*—Trop, Pruner & Hu, P.C.

(57) ABSTRACT

A controller for controlling communications between a system and a transport medium includes a receiving circuit to receive data and associated security control information. A first cryptographic engine cryptographically processes the data received from the transport medium based on the security control information. The controller also includes a second cryptographic engine to process data generated in the system according to a security protocol before transmission to the transport medium.

20 Claims, 12 Drawing Sheets

U.S. PATENT DOCUMENTS

| | | | | |
|---|---|---|---|---|
| 6,496,572 | B1* | 12/2002 | Liang et al. | 379/93.35 |
| 6,516,412 | B2* | 2/2003 | Wasilewski et al. | 713/168 |
| 6,634,701 | B2* | 10/2003 | Votruba et al. | 296/182.1 |
| 6,701,433 | B1* | 3/2004 | Schell et al. | 713/164 |
| 6,701,437 | B1* | 3/2004 | Hoke et al. | 713/201 |
| 6,750,944 | B2* | 6/2004 | Silverbrook et al. | 355/18 |
| 6,785,728 | B1* | 8/2004 | Schneider et al. | 709/229 |
| 6,889,214 | B1* | 5/2005 | Pagel et al. | 705/410 |

OTHER PUBLICATIONS

S. Kent et al., *IP Authentication Header*, pp. 1-22, printed from web site http://sunsite.auc.dk/RFC/rfc/rfc2402.html, (Nov. 1998).

S. Kent et al., *IP Encapsulating Security Payload* (*ESP*), pp. 1-22, printed from web site http://sunsite.auc.dk/RFC/rfc/rfc2406.html, pp. 1-22 (Nov. 1998).

R. Thayer et al., *IP Security Document Roadmap*, pp. 1-11, printed from web site http://sunsite.auc.dk/RFC/rfc/rfc2411.html (Nov. 1998).

Orman, *IPSEC* (*A Simple IP Security Layer*), pp. 1-2, printed from web site http://www.cs.arizona.edu/xkernel/www/manual/subsection3_19_16.html (Nov. 24, 1994).

Spangler, *TECH ABC: IPsec Builds Virtual Bridges for Security*, pp. 1-3, printed from web site http://www.internetworld.com/print/...nfrastructure/1997/19971110-bridges.html, (Nov. 10, 1997).

3Com, *Introducing the 3CR990-TX-97 10/100 PCI NIC With 3XP Processor*, pp. 1-5, printed from web site http://www.3com.com/products/dsheets/3cr990.html, dated at least as early as Jun. 24, 1999.

\* cited by examiner

TRANSPORT MODE

TUNNEL MODE

TECHNIQUE AND APPARATUS FOR PROCESSING CRYPTOGRAPHIC SERVICES OF DATA IN A NETWORK SYSTEM

BACKGROUND

The invention relates to protection of information communicated over a transport medium such as a network.

With the increasing use of networks and other transport media for communications, security has become an increasing concern. Various security protocols have been utilized to protect data entering or leaving a device that is coupled to a transport medium such as a network (e.g. local area network, wide area network, the Internet). A security protocol may include cryptographic algorithms (including encryption, decryption, and authentication) to maintain the confidentiality of transmitted information as well as authentication of the information origin.

Cryptographic operations typically involve data intensive arithmetic operations that take up substantial amounts of processing in a system. To reduce the load on a main processor in a system in performing cryptographic operations, some systems include a coprocessor to perform some of the data intensive processing. In a conventional coprocessor architecture, a main processor (under control of an application program) loads data to be processed (encrypted, hashed, and so forth) into a system memory, which may be accessed by a coprocessor over a system bus. After processing, the coprocessor may then copy the processed data back to the memory for access by the main processor, which may then transmit the data out onto a transport medium (e.g., a network, telephone line, etc.). This process is inefficient as data is copied twice over the bus into system memory prior to it being transmitted over a transport medium. Similarly, at the receive end, the data also is copied twice to and from a coprocessor before it is decrypted and validated.

Running cryptographic operations in a conventional coprocessor architecture may use up valuable shared systems resources, including the main processor, bus, and system memory, making them unavailable to other devices in a system. This may reduce overall system performance. Thus, a need arises for a technique and apparatus that reduces use of system resources in performing operations associated with a security protocol when communicating information to a transport medium.

SUMMARY

In general, according to one embodiment, a method for use in a device coupled to a communications channel includes determining a security service to perform with a data block and processing, in a controller adapted to control communication with the communications channel, the data block according to the security service.

Other features and embodiments will become apparent from the following description and from the claims.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible.

Referring to FIG. 1, an embodiment of a system includes a first device 50 and a second device 51 that are coupled to a transport medium, which may be a wired or wireless transport medium (or a combination of both). In the ensuing description, the transport medium is referred to as a network 47, which may include one or more types of transport media, whether wired or wireless, such as telephone lines, cable lines, local area networks (LANs), wide area networks (WANs), the Internet, radio frequency links, cellular links, or other transport media. Each of the devices 50 and 51 may include a computer, a hand-held computing device, a set-top box, an appliance, a game system, or any other controller-based system in which the controller may be a microprocessor, a microcontroller, a programmable device such as an application-specific integrated circuit (ASIC), a programmable gate array (PGA), or the like.

Different types of communications may be possible over the network 47 between the devices 50 and 51 as well as other devices. Communications may include, for example, transmission of electronic mail; Internet browsing; file access and copying; database searching; on-line sale and financial transactions; and so forth.

To provide secure communications between devices or systems on the network 47, a security protocol according to some embodiments may be implemented in devices coupled to the network 47. In some embodiments, Internet Protocol security (IPSEC), as discussed in Request for Comment (RFC) 2401, entitled "Security Architecture for the Internet Protocol," dated November 1998, implemented in devices coupled to the network 47 may provide security services to ensure confidential communications between authenticated parties, as further described below.

In this description, reference is made to various Requests for Comments (RFCs), which are available at several sites on the Internet. One such site is {http://www.ietf.org/rfc.html}.

Figure 1A:
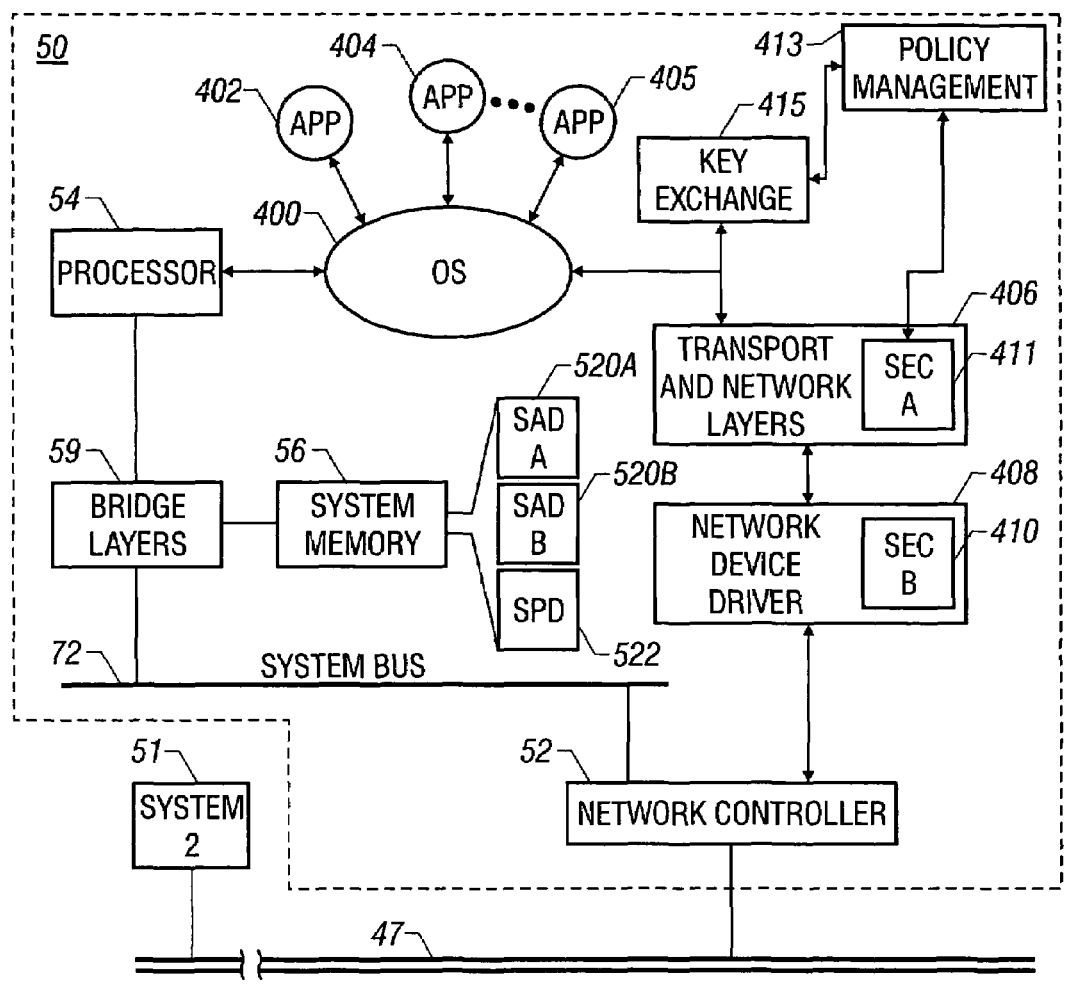
FIG. 1A is a block diagram of an embodiment of a system including a network and devices coupled to a network.

As illustrated in FIG. 1A, each of the devices 50 and 51 (as well as other devices that may be coupled to the network 47) may include various layers and components to enable communication on the network 47. For example, in the device 50, a network controller 52 (which may be an integrated network controller chip or a board or card including several chips or some other hardware component) is coupled between the network 47 and a system bus 72. In one example embodiment, the system bus 72 may be a Peripheral Component Interconnect (PCI) bus, as described in the PCI Local Bus Specification, Production Version, Revision 2.1, published in June 1995. More complete diagrams and descriptions of the device 50 and the network controller 52 are provided in connection with FIGS. 2 and 3, respectively, below.

According to some embodiments, to improve system performance, cryptographic processing (including encryption, decryption, and/or cryptographic signature) that is part of the network security protocol is performed by the network controller 52, which may be implemented as a hardware component with associated firmware or microcode, "on-the-fly" or "in transit." Other types of controllers for controlling communications with a communications channel or transport medium may also be used in further embodiments. Such controllers may include purely hardware implementations or a combination of hardware and firmware or software.

Figure 1B:
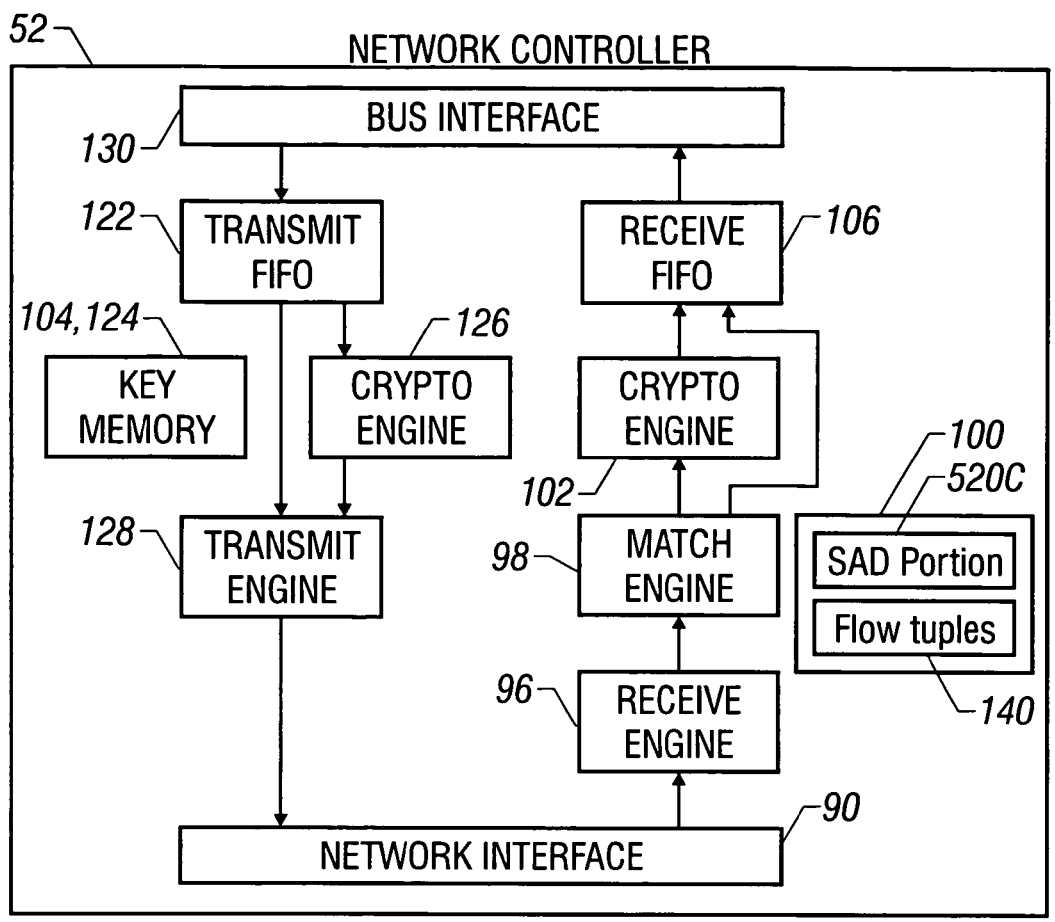
FIG. 1B is a block diagram of a network controller according to one embodiment in a device in the system of FIG. 1A.

Referring further to FIG. 1B, the network controller 52 includes cryptographic engines (126 in the transmit side and 102 in the receive side) to perform encryption, decryption, and authentication operations on data blocks to be transmitted or that have been received. An advantage of separate cryptographic engines 102 and 126 in the receive and transmit paths, respectively, is that cryptographic processing of transmission data and received data may be performed concurrently. In an alternative embodiment, a single engine may be used for both transmission and received data.

As used in this description, a data block or data blocks may refer to data of various formats in the device. For example, a data block from the transport and network layers 406 may include an IP datagram or packet (if the network layer is an IP layer). If an IPSEC protocol (e.g., AH or ESP) is used, then the data block is transformed to an IPSEC packet after IPSEC processing. An IP datagram or packet and an IPSEC packet may be reformatted after flowing through each of the different layers in the device 50. The security protocol may be applied to one or more IP datagrams or packets and IPSEC packets. If other security protocols are implemented, other types of data blocks may be defined. IPSEC may use one of two protocols to provide traffic security-Authentication Header (AH) and Encapsulating Security Payload (ESP). These protocols may be applied alone or in combination with each other to provide a desired set of security services. The AH protocol is described in RFC 2402, entitled "IP Authentication Header," dated November 1998, and the ESP protocol is described in RFC 2406, entitled "IP Encapsulating Security Payload (ESP)," dated November 1998.

To reduce complexity of the network controller 52, generation of security control information associated with security protocols may be performed by one or more software routines (e.g., 410 and 411) in the device 50. In one embodiment, security control information may include information identifying the encryption and authentication algorithms, location of keys, location and length of data to be encrypted or signed, location of signatures, and other information used by the network controller 52 for cryptographic processing (including encryption, decryption, and/or authentication).

There may be instances (described below) in which multiple cryptographic operations are performed on a data block by the network controller 52. To handle such cases, a loopback feature in the network controller 52 routes data blocks processed by the cryptographic engine 126 back to the device 50 for further processing by the one or more software routines 410 and 411. After further processing by routines 410 and 411, the data blocks may be sent back to the network controller 52 for further cryptographic processing.

Another feature of some embodiments is that the cryptographic engine 126 or 102 (or both) in the network controller 52 may be used by application processes aside from processes that need to perform secure communications over the network 47. Such application processes are referred to as secondary use processes. For example, a secondary use process may perform communications to an external device through another interface (other than the network controller 52) in the device 50. A secondary use process may include any process that does not perform, or that is not capable of performing, cryptographic processing in transit. Examples of secondary use processes include encrypted file systems, secure e-mail, secure remote procedure call (RPC), and so forth. Instead of using a separate coprocessor or a main processor 54 to perform cryptographic operations for such secondary use processes, a cryptographic engine of the network controller 52 may be used.

The device 50 may include a policy management routine 413 that keeps track of the security services available in the device 50. The policy management routine 413 maintains databases (e.g., 520A described below) that identify security services to perform with different data flows between different devices on the network 47. For example, security services for devices that are coupled by a local area network may be different from security services for devices that are coupled through an unsecure channel such as the Internet. The device 50 also includes a key exchange component 415 that manage the generation and transport of keys used for encryption and authentication. The components 413 and 415 may be defined according to an Internet Security Association and Key Management Protocol (ISAKMP), as described in Request for Comment (RFC) 2408, dated November 1998.

Still referring to FIG. 1A, in the device 50, the system bus 72 is coupled to other devices in the system, including the main processor 54 that may be coupled to the system bus 72 through one or more bridge layers 59. As examples, the processor 54 may include a microprocessor, a microcontroller, an ASIC, a PGA, and the like. Data packets, frames, or blocks transmitted between the network 47 and various application processes (such as 402 and 404) are passed through several layers in the device 50. As examples, the application processes 402 and 404 may include electronic mail applications, network browsers, file managers, or any other applications that are able to access locations on the network 47.

In the transmit and receive paths, data is routed between the application processes 402, 404 and the network 47 through the network controller 52, a network device driver 408, transport and network layers 406, and an operating system (OS) 400. The network and transport layers 406 may be a Transmission Control Protocol/Internet Protocol (TCP/IP) stack to perform data routing and flow control as well as verification and sequencing of data in the device 50. Thus, in one embodiment, the network layer may be an Internet Protocol (IP) layer, as described in Request for Comment (RFC) 791, entitled "Internet Protocol," dated September 1981, which defines a protocol for transmission of blocks of data called datagrams from sources to destinations identified by source and destination IP addresses. Above the network layer is the transport layer, which may be the Transmission Control Protocol (TCP) or User Datagram Protocol (UDP) layer, as examples. TCP is described in Request for Comment (RFC) 793, entitled "Transmission Control Protocol,"

dated September 1981. UDP is described in RFC 768, entitled "User Datagram Protocol," dated August 1980.

According to some embodiments, to implement a security protocol for the network 47 in the network controller 52, a security routine 410 in the network device driver 408 and a security routine 411 in the transport and network layers 406 format data blocks according to the security protocol and add security control information to send to the network controller 52 along with associated data blocks. In this description, the routine 410 is referred to as the driver security routine 410, and the routine 411 is referred to as the IP security routine 411. In further embodiments, the tasks performed by the security routines 410 and 411 may be performed by one routine or by more than two routines.

Depending on the type of OS 400 used, the IP security routine 411 may be part of the network and transport layers 406 (as illustrated in FIG. 1) or it may be a separate routine. For example, with the Windows® NT, Version 5, operating system, the IP security routine 411 may be part of layers 406. With the Windows® NT, Version 4, or the Windows® 98 operating system, however, the IP security routine 411 may be a separate driver routine.

Based on the security control information, if any, generated by the security routines 410 and 411, the network controller 52 performs cryptographic processing (including encryption and/or authentication) of data blocks before transmission to the network 47. If the security control information indicates that cryptographic processing is unnecessary, the network controller 52 sends the data blocks to the network 47 without passing the data blocks through the cryptographic engine 126 in the network controller 52.

On the receive side, when the network controller 52 receives a data block, the network controller 52 determines from a security control portion of the received data block if cryptographic process is needed, and if so, which key or keys to use to perform decryption and authentication.

According to some embodiments, the security protocol implemented in the device 50 and some other devices coupled to the network 47 includes an IPSEC protocol. IPSEC provides security services by enabling the device 50 to select required security protocols, determine the algorithm(s) to use for the service(s), and put in place any cryptographic keys employed to provide the requested services. Although this description refers to IPSEC security protocols such as the AH and ESP protocols, the invention is not to be limited in this respect. Other types of security protocols may be implemented in further embodiments. Further, in other embodiments, other types of transport and network layers besides TCP and IP layers may be used.

Figure 4A:
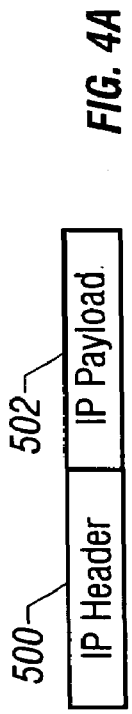
FIGS. 4A-4C are diagrams of packets according to a security protocol used by the device of FIG. 2.
Figure 4B:
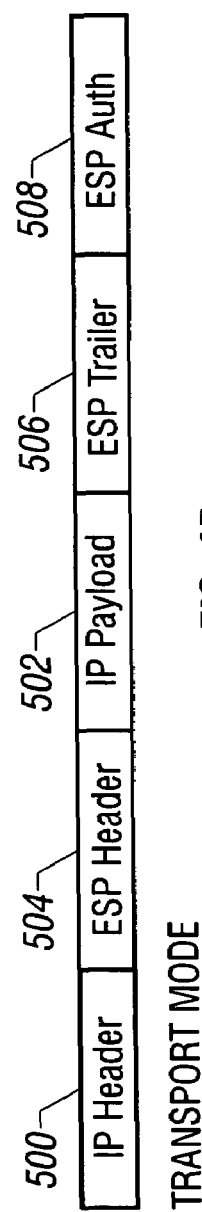
Figure 4C:
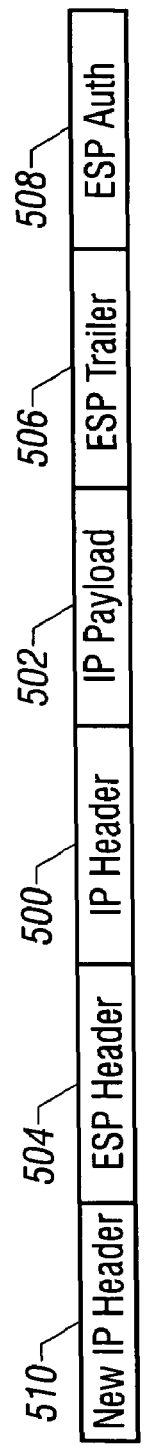

In one embodiment, the IP security routine 411 performs IPSEC processing of an IP packet that is to be transmitted to or that has been received from the network 47. IPSEC processing includes converting an IP packet to an IPSEC packet and vice versa. The IPSEC packet may either be an ESP packet or an AH packet according to some embodiments. Security control information is included in the IPSEC packet. Referring to FIGS. 4A-4C, after IPSEC processing, an IP datagram including an IP header 500 and an IP payload field 502 (FIG. 4A) may be transformed to an ESP packet as illustrated in FIGS. 4B and 4C. The ESP packets shown in FIGS. 4B and 4C (representing ESP packets in transport mode and tunnel mode, respectively) include the following fields: an ESP header 504, an ESP trailer 506, and an ESP authorization field 508. In transport mode (FIG. 4B), the ESP security protocol is applied to the IP payload 502. In tunnel mode, however, the ESP security protocol is also applied to the IP header 500—consequently, a new IP header 510 is created for the ESP packet in tunnel mode (FIG. 4C) that identifies the address of a security gateway, for example. Tunnel mode ESP is typically used when communication over the network 47 occurs through two security gateways. In an AH packet (not shown), an AH header may be added before the IP payload (transport mode) or before the IP header and IP payload (in tunnel mode), but no trailer information is added.

The ESP header and trailer fields 504 and 506 may include the following: a security parameters index (SPI), which in combination with certain other information identifies security services to be performed on a datagram; a sequence number that monotonically counts up and is included with the datagram as a defense against a replay attack; information such as cryptographic synchronization information; any padding employed for encryption such as used for a block cipher; and other information. The authentication field 508 is used with the authentication service.

The ESP header 504 may also include IPSEC control information that identifies the cryptographic algorithms to be applied by the network controller 52, locations of keys, locations and lengths of data to be encrypted and/or signed, and other information employed for encryption and/or authentication. In addition, the ESP header 504 may also contain an indication of whether a datagram is to be transmitted over the network 47 after cryptographic processing or routed back to the system bus 72 in the loopback mode. The ESP header includes a protocol type field, which may point to TCP, UDP, and so forth, in which case the datagram is transmitted on to the network 47. Alternatively, if the protocol type field points to ESP or AH, loopback is performed.

An AH header contains similar information to provide for authentication services. However, AH does not provide for encryption. In some embodiments, the AH and ESP protocols may be implemented in combination to provide security services.

Encryption, decryption, and authentication algorithms are determined based on the security association (SA) of an IP datagram. An SA indicates the types of security services that are associated with the IP datagram. Further description of SAs is provided in RFC 2401 referenced above. The security associations of different IP datagrams are stored in one or more security association databases (SADs) 520A and 520B, which may be stored in a storage medium such as the main memory 56 or a hard disk drive, as examples. Security associations may be managed by the policy management routine 413.

In the illustrated embodiment, the SAD 520A is accessible by the IP security routine 411, and the SAD 520B is accessible by the driver security routine 410. The SAD 520B may contain a subset of the SAD 520A for quicker access by the driver security routine 410. In alternative embodiments, both security routines 410 and 411 may access the same SAD. In addition, for processing of a packet received by the network controller 52 over the network 47, the network controller 52 includes an SAD 520C, which may be a subset of the information stored in SAD 520A or 520B.

For inbound processing of a packet (which may either be an IPSEC packet or unencrypted IP datagram) received from the network 47, the SA of the packet is determined by the network controller 52 from the following information in the received packet: the destination IP address; the IPSEC protocol (AH or ESP); and the SPI value. The listed information from a received IPSEC datagram may be compared to information stored in entries 140 (referred to as flow tuples) in a storage device or memory 100 (which may be a static random access memory or SRAM, for example) in the network controller 52 to determine if a match occurs. The combination of such information may be used to index into the SAD 520C stored in the storage device 100. The SAD 520C stored in the network controller 52 may be updated based on a least recently used (LRU) replacement policy, first-in-first-out (FIFO) policy, or other policy.

Thus, based on the SA (if any) of a received packet, suitable keys and other cryptographic information may be retrieved from a storage location (such as in a storage device 104 or other location) to perform decryption and authentication processing. Although the SAD 520C is stored inside the network controller in the illustrated embodiment, it is contemplated that the security association information and flow tuples may be stored in an external storage device coupled to the network controller.

For outbound processing of an IP datagram to be transmitted over the network 47, the IP security routine 411 determines the SA associated with the outbound IP datagram based on certain fields of the IP datagram. Such fields may indicate source and destination devices and addresses, from which the types of security services may be determined for communications between the source and destination devices. For example, the devices may be coupled to a local area network, in which case a first set of security services may be performed. If the devices are coupled to security gateways (such as devices that couple a LAN to an unsecure link such as the Internet), then a second set of security services (that provide enhanced security) may be performed. The IP datagram is converted to an IPSEC packet that includes security control information based on the associated SA. The IPSEC packet is sent by the IP security routine 411 down to the driver security routine 410 in the network device driver 408, which repackages the IPSEC packet to forward to the network controller 52.

Figure 8:
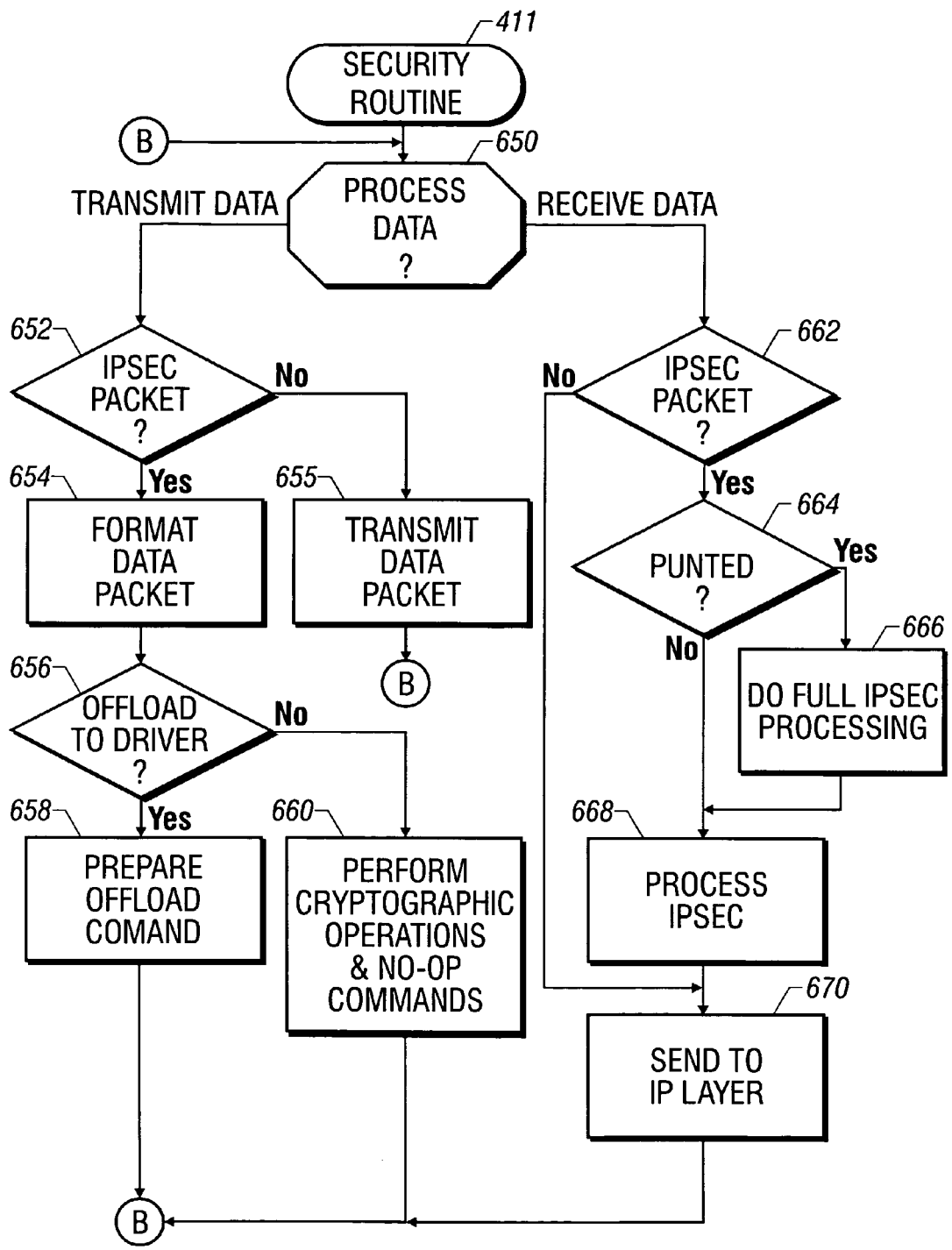
FIGS. 8 and 9A-9B are flow diagrams of security routines in different layers in the device of FIG. 2.

Referring to FIG. 8, security operations performed by the IP security routine 411 are illustrated. If an IP packet to be transmitted is detected (at 650), the IP security routine 411 determines (at 652) if the IP packet is subject to a security protocol based on its SA. This may be determined based on information in the SAD 520A, and if not there, from a Security Policy Database (SPD) 522, which may be stored in a storage device such as the system memory 56.

The SPD 522 indicates if a datagram is afforded IPSEC protection or if IPSEC protection is bypassed. If IPSEC protection is to be implemented for a datagram, then a selected entry in the SPD 522 maps to an SA that identifies security services to be performed on the datagram, including whether the AH or ESP protocol is to be employed, the cryptographic algorithms to be used for encryption/decryption and authentication, and so forth. The identified security services are coded into the security-control information (located in an ESP or AH header, for example) by the IP security routine 411 for transmission to the network controller 52 to perform cryptographic processing.

Information (referred to as selectors) in an IP datagram may be used to index into an entry in the SPD 522. Such selectors may include the following information: destination IP address; source IP address; transport layer protocol (e.g., TCP or UDP); and source and destination ports (e.g., a TCP or UDP port); and other information. The selectors associated with a datagram are then used to perform a lookup of the SPD 522 to retrieve information in an entry of the SPD 522. In turn, the SPD entry information is used to determine an SA of the IP datagram, which can then be loaded into a corresponding entry of the SAD 520A.

Although reference is made to the SPD and SAD to identify security services to be performed on a data block, the invention is not to be limited in this respect. Other techniques for determining security services may be employed in further embodiments.

If the IP security routine 411 determines (at 652) that IPSEC protection is not to be employed, then the IP datagram is forwarded (at 655) to the network device driver 408 for transmission as a regular IP datagram over the network 47 by the network controller 52. If, however, IPSEC protection is employed, the IP datagram is reformatted (at 654) as an IPSEC packet, as illustrated in FIGS. 4A-4C in one example.

Next, the EP security routine 411 determines (at 656) if cryptographic operations are to be offloaded to the network device driver 408 and network controller 52. Offloading according to some embodiments refers to the IP security routine 411 forwarding cryptographic operations to a lower layer (e.g., the network controller 52) rather than the IP security routine 411 performing cryptographic operations itself, which may take up valuable time of the main processor 54. Offloading security services may not be performed if, for example, a cryptographic operation is not supported by the network controller 52, if the cost of performing the cryptographic operation on the processor 54 is insubstantial, or if the cost of offloading would be higher compared to performing the cryptographic operation on the CPU 54.

If offloading is desired, then offload commands (including the security control information) are prepared (at 658) by the IP security routine 411 in the header portion of the IPSEC packet to indicate the types of algorithms to use for encryption and/or authentication, locations of keys, locations and lengths of data to be encrypted and/or signed, and other related information. If offloading is not desired, then the IP security routine 411 performs the desired cryptographic operations (at 660) and a no-op command (to indicate no cryptographic operations are necessary) may be included in the IPSEC packet that is sent to the driver security routine 410 in the network device driver 408.

Figure 9A:
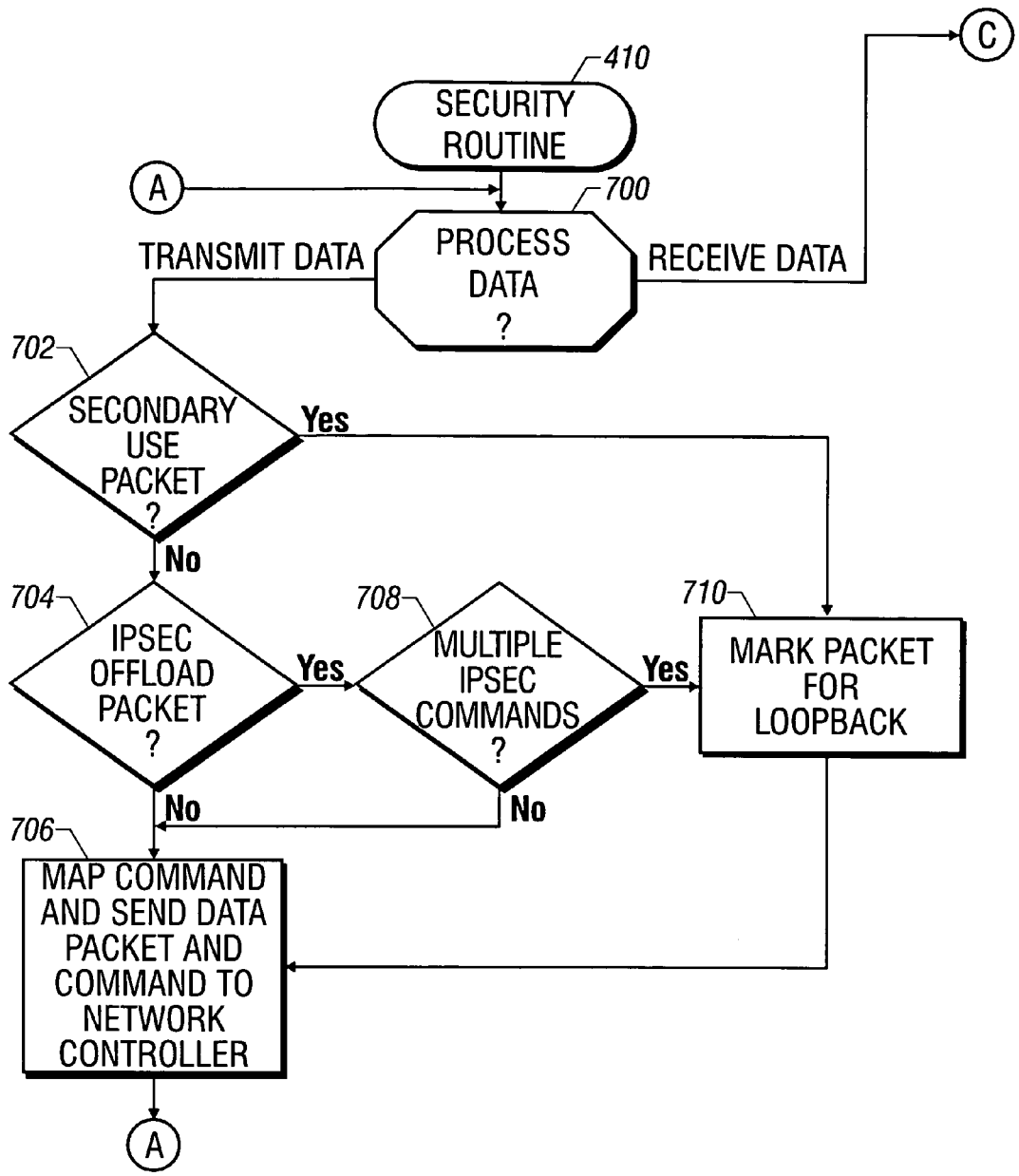

Referring to FIG. 9A, the transmit portion of the network device driver security routine 410 is illustrated. If transmission data is received (at 700) from the IP security routine 411, the driver security routine 410 determines (at 702) if the IPSEC packet is a secondary use packet (that is, a packet that originated from a secondary use process, e.g., 405). If so, then the IPSEC packet is marked (at 710) for loopback mode so that the packet can be returned to the secondary use process (e.g., process 405 in FIG. 1A) after cryptographic processing by the network controller 52. The packet is processed (at 706, described below) and sent to the network controller 52.

If the IPSEC packet is not a secondary use packet, then the driver security routine 410 determines (at 704) if the packet includes offload commands. If so, the driver security routine 410 determines (at 708) if the packet includes multiple commands (such as to perform multiple security protocols on the packet). If so, the IPSEC packet is marked (at 710) for loopback mode.

Next, commands in the IPSEC packet are converted (at 706) to a format (including device specific operations) that can be understood by the network controller 52 for processing by the network controller 52. The IPSEC packet sent by the driver security routine 410 to the network controller 52 includes security control information that identifies the encryption and/or authentication algorithms to use, location of keys, location and lengths of data to be encrypted and/or signed, and other related information. Based on the security control information, cryptographic processing is performed by the network controller 52 before packets are transmitted to the network 47.

Figure 9B:
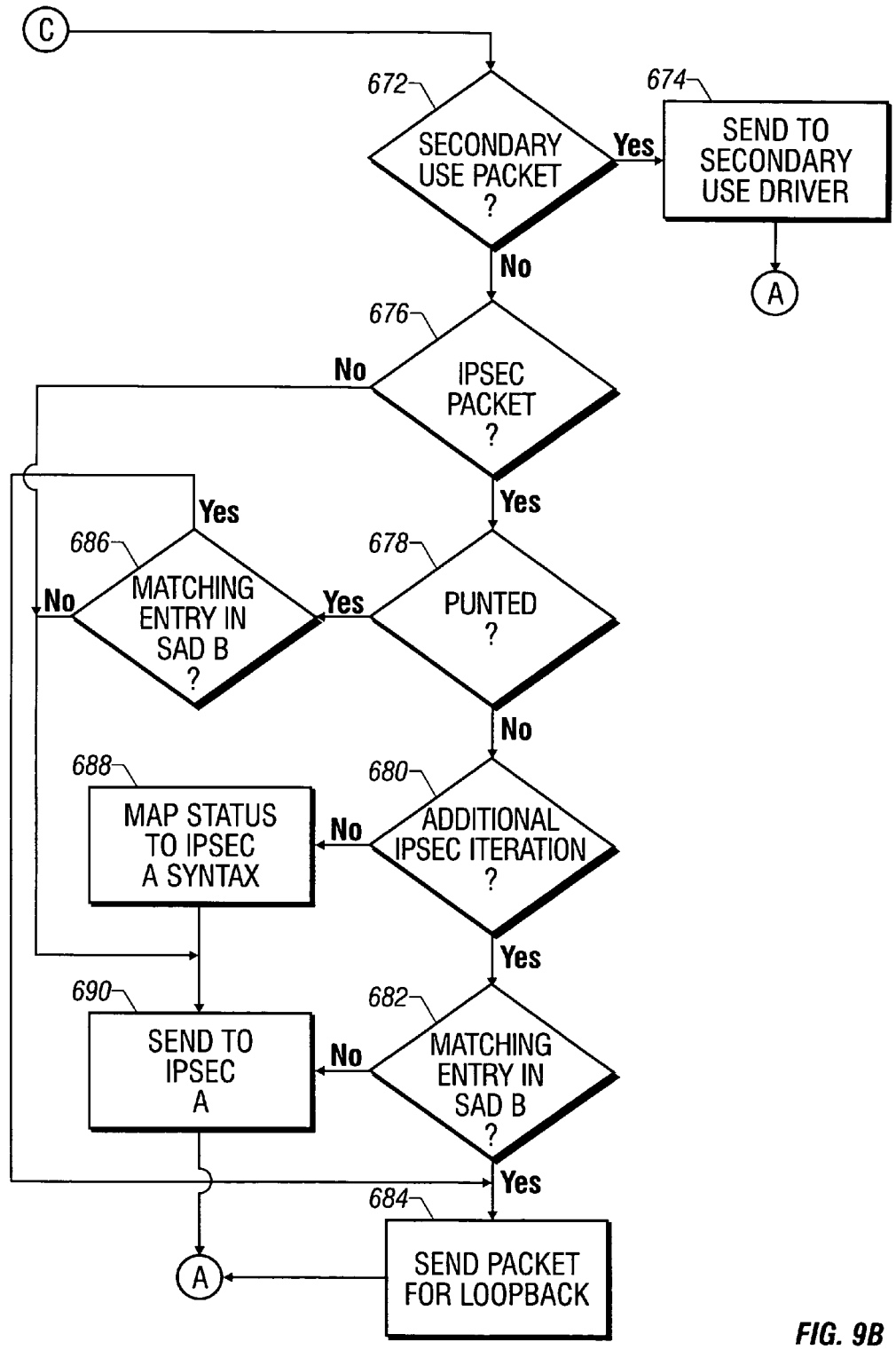

Referring further to FIG. 9B, the receive portion of the driver security routine 410 is illustrated. The driver security routine 410 receives (at 700) from the network controller 52 (which may be a packet received over the network 47 or a secondary use packet that is to be returned to a secondary use application process). Next, the driver security routine 410 determines (at 672) if the packet is a secondary use packet. If so, the packet is sent back (at 674) to the secondary use process (e.g., 405) through its driver, for example.

If the received packet is not a secondary use packet, then the driver security routine 410 determines (at 676) if the received packet is an IPSEC packet. If not, then the packet is sent up by the network device driver 408 (at 690) to the transport and network layers 406 for handling. If the packet is an IPSEC packet, the driver security routine 410 determines (at 678) if the packet was "punted" by the network controller 52. The network controller 52 may have been unable to associate an SA with the received IPSEC packet based on a comparison with the limited SAD 520C. If the packet was punted by the network controller 52 due to inability to associate an SA in the SAD 520C stored in the network controller 52, the driver security routine 410 attempts (at 686) to match the received IPSEC packet with an entry in the SAD 520B. If a match cannot be found, then the packet is sent up (at 690) to the IP security routine 411 for handling. However, if an entry in the SAD 520B can be matched with the punted IPSEC packet, then the IPSEC packet is modified to include the security control information of the associated SA and the packet is sent back (at 684) to the network controller 52 with loopback mode set. This allows further cryptographic processing by the network controller 52. However, if the IPSEC packet was punted because the network controller 52 is unable to perform cryptographic processing, then the packet is forwarded up to the transport and network layers 406 for processing.

If the driver security routine 410 determines (at 678) that the packet was not punted by the network controller 52, then the driver security routine 410 determines if additional IPSEC iterations are needed (at 680), such as for IPSEC packets with nested SAs. If not, the status information in the IPSEC packet (indicating processing performed by the network controller 52 including decryption and/or authentication, for example) is converted (at 688) to a syntax understood by the IP security routine 411. The packet is then sent (at 684) to the IP security routine 411.

If, at 680, an additional IPSEC iteration is needed, the driver security routine 410 attempts to match (at 682) an entry in the SAD 520B with the packet to identify its SA. If a match is found, then the packet is sent back (at 684) to the network controller 52 with loopback mode set. If the SA of the packet cannot be found in the SAD 520B, then the packet is sent up (at 690) to the IP security routine 411 for handling.

Referring again to FIG. 8, when the IP security routine 411 receives a packet from the driver security routine 410, the IP security routine 411 determines (at 662) if the packet is an IPSEC packet. If not, the packet is sent (at 670) to the IP layer (406). If the packet is an IPSEC packet, then the IP security routine 411 determines (at 664) if the packet was punted by the network controller 52 and the network device driver 410. If so, the IP security routine performs (at 666) full IPSEC processing, including cryptographic processing of the packet. Alternatively, the IP security routine 411 can determine the SA of the packet by accessing the SAD 520A or SPD 522, and the security control information associated with the SA may be sent along with the packet down to the network controller 52 for cryptographic processing.

If the IPSEC packet was not punted, then the IP security routine 411 performs (at 668) normal IPSEC processing to convert the packet back to an IP datagram to send (at 670) to the IP layer.

Figure 10:
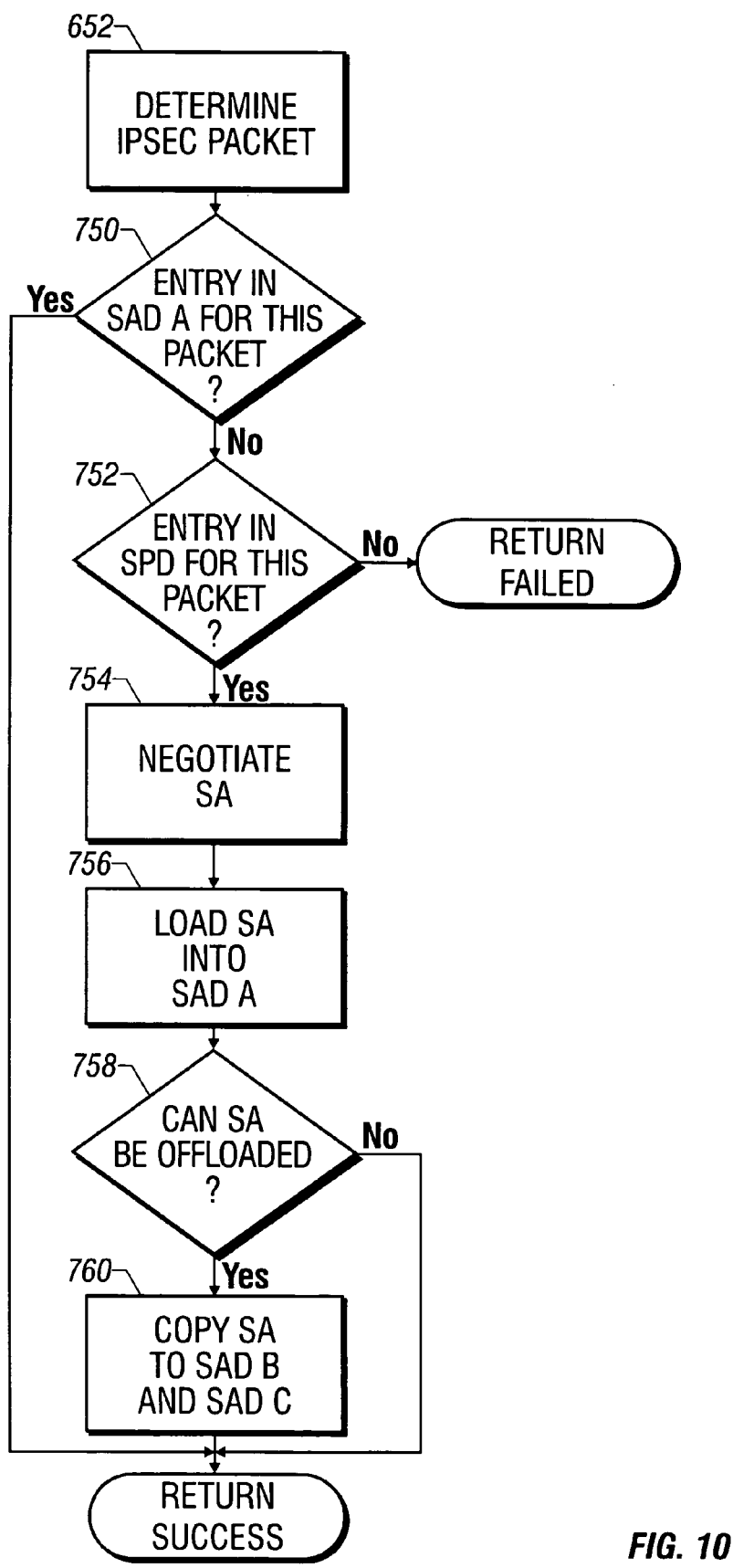
FIG. 10 is a flow diagram of a process of determining security services associated with a data block performed by the security routine of FIG. 8.

Referring to FIG. 10, the act (at 652 in FIG. 8) performed by the IP security routine 411 to determine if an IP packet can be associated with an SA includes determining (at 750) if an entry in the SAD 520A associated with the IP packet can be found. This can be based, for example, on certain selectors as described above. If a match in the SAD 520A is found, the SA has been identified and a success flag is returned. However, if a match is not found in the SAD 520A, then the SPD 522 is accessed (at 752) based on the selectors. If a match cannot be identified, then a fail flag is returned to indicate an SA does not exist for the IP datagram. However, if a match is identified in the SPD 522 (at 752), then the SA is identified (at 754) and loaded (at 756) into the SAD 520A. The IP security routine 411 then determines (at 758) if the security services associated with the identified SA can be offloaded to the network controller 52. During a setup phase, the IP security routine 411 queries the driver security routine 410 to determine security services that may be offloaded from the IP security routine 411 to the driver security routine 410. This information may be kept in a storage location and may identify the types of encryption and authentication services that may be performed, the types of security protocols (e.g., AH and ESP) that are supported, and so forth, by the driver security routine 410. If the security services can be offloaded, the SA is also copied (at 760) to the SAD 520B and optionally to the SAD 520C in the network controller 52. If the security services cannot be offloaded, then the identified SA is not copied to the SAD 520B and 520C.

When updating the SAD 520C in the network controller 52, the IP security routine 411 determines if the SAD 520C is full, and if so, an SA is replaced using some replacement policy, e.g., least recently used, first-in-first-out, random, and so forth. Such update policies may also be performed with the SADs 520A and 520B.

Figure 2:
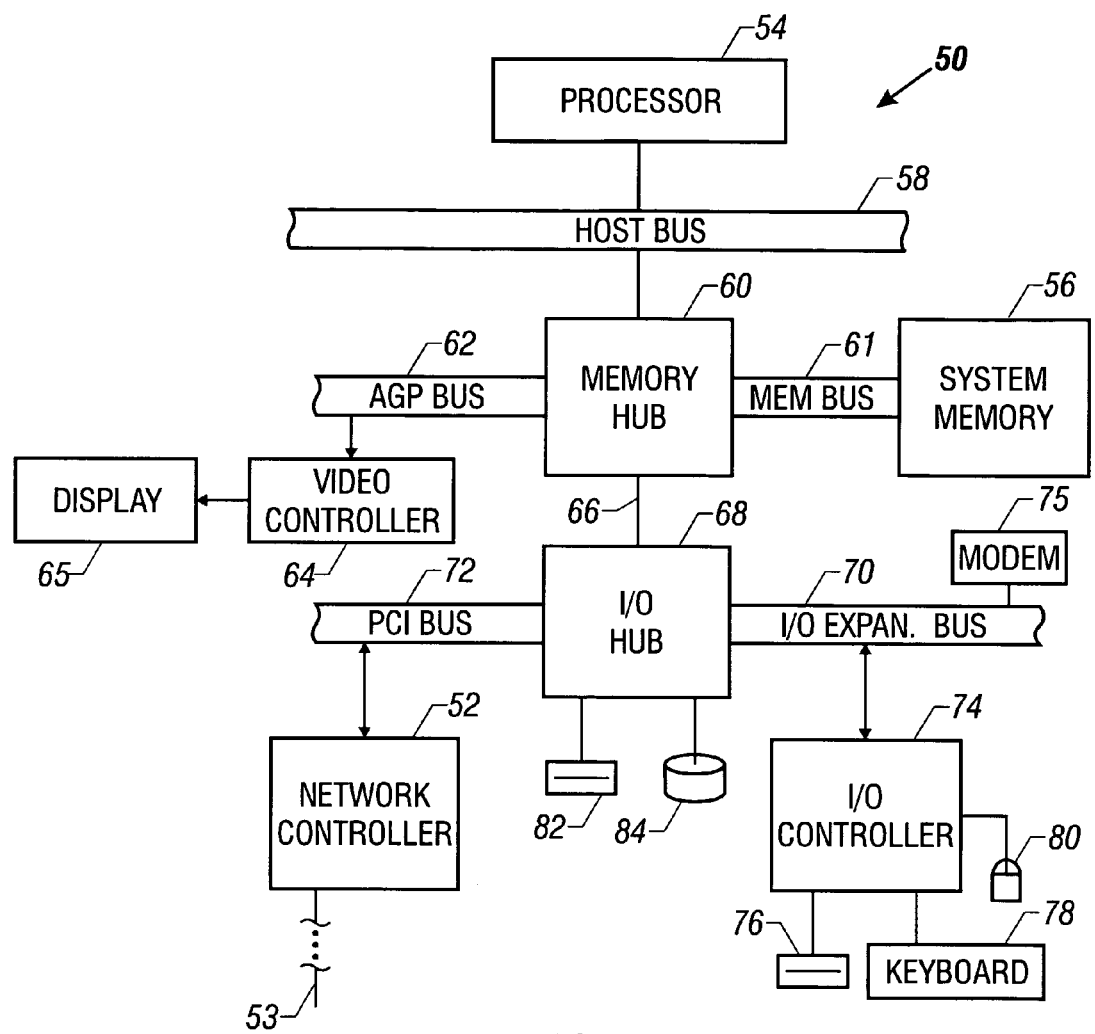
FIG. 2 is a block diagram of a device in the system of FIG. 1A according to an embodiment of the invention.

Referring to FIG. 2, an embodiment of the device 50 (which may be a computer system, for example) includes the network controller 52 (a local area network (LAN) controller, for example) that communicates packets of information with other networked devices (e.g., hosts, gateways, routers, etc.) over the network 47. The network controller 52 may be adapted to perform operations that are typically performed by the main processor 54 that executes one or more software layers (a network layer and a transport layer, as examples) of a network protocol stack (a TCP/IP stack, for example). As an example, these operations may include parsing headers of incoming packets to obtain characteristics (of the packet) that typically are extracted by execution of the software layers.

In some embodiments, the characteristics, in turn, may identify an application process that is to receive data of the packet. Due to this identification by the network controller 52, the network controller 52 (and not a software layer of the stack) may directly control the transfer of the packet data to a buffer (in a system memory 56) that is associated with the application. As a result of this arrangement, data transfers between the network controller 52 and the system memory 56 may take less time and more efficiently use memory space, as further described below.

Figure 3:
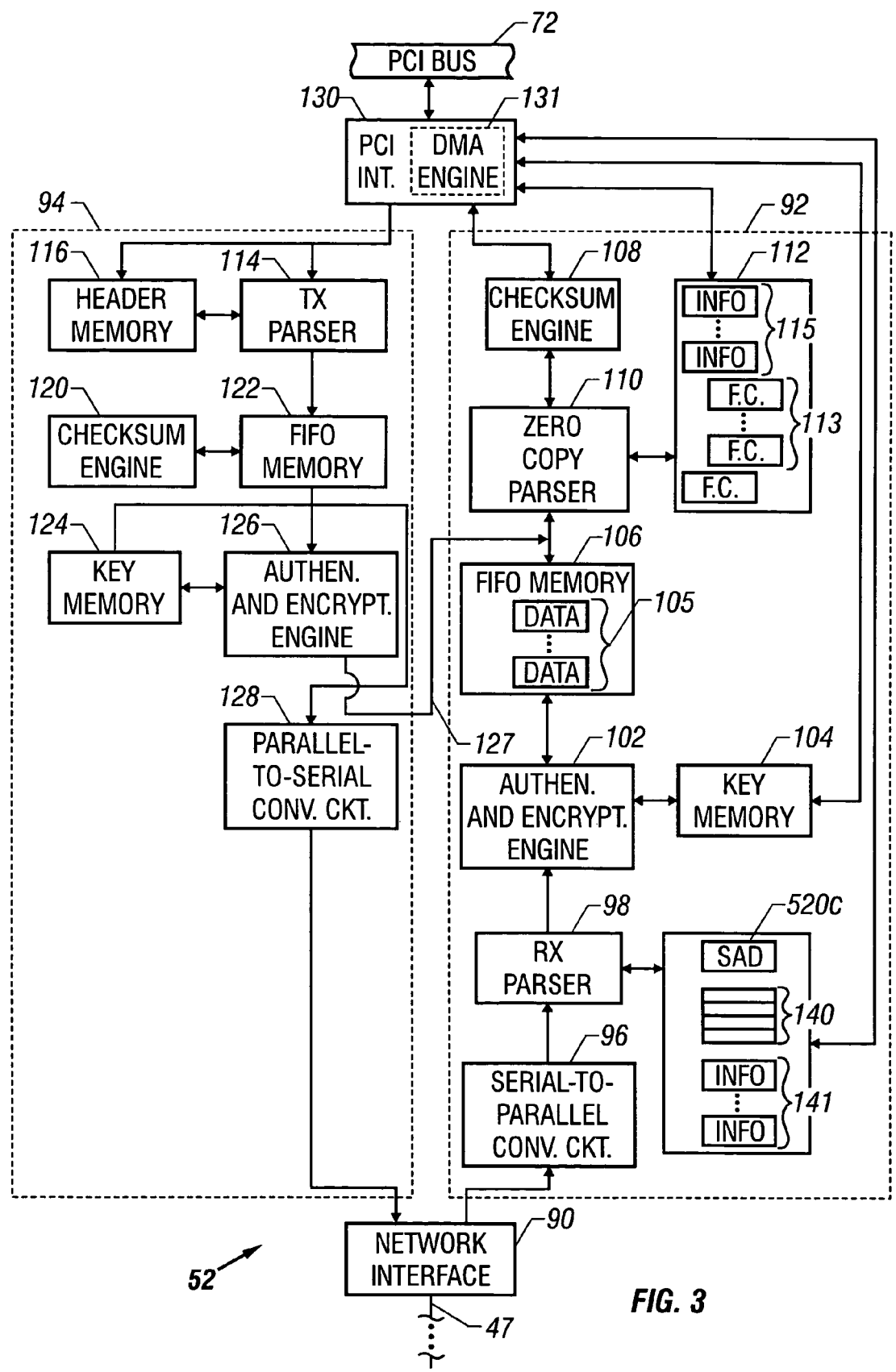
FIG. 3 is a more detailed block diagram of the network controller of FIG. 1B.

Referring to FIG. 3, the network controller 52 may include circuitry, such as a receive path 92 and a transmit path 94 to process packets that are received from, or are transmitted to, the network 47. For example, the receive path 92 may include a receive parser 98 to parse a header of each packet to extract characteristics of the packet, such as characteristics that associate a particular flow with the packet. Because the receive path 92 may be receiving incoming packets from many different flows (packets from different devices on the network 47), the receive path 92 may include the memory 100 that stores flow tuples 140. Each flow tuple 140 uniquely identifies a flow that is to be parsed by the network controller 52.

Figure 6:
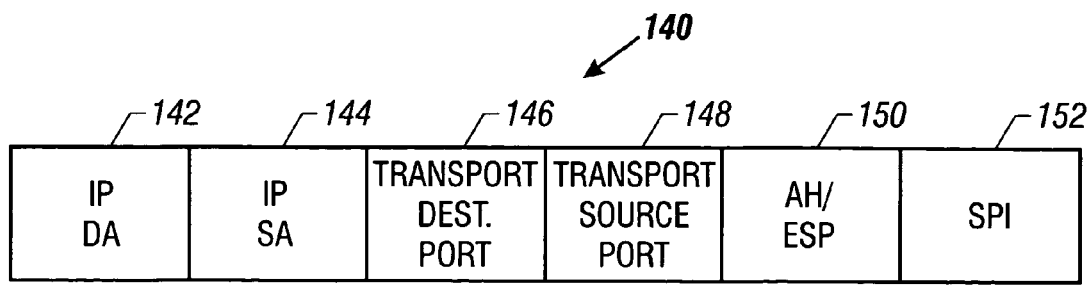
FIG. 6 illustrates a flow tuple stored in a storage device in the network controller of FIG. 3.

Referring to FIG. 6, each flow tuple 140 includes fields that identify characteristics of a particular flow. As an example, in some embodiments, at least one of the flow tuples 140 may be associated with a Transmission Control Protocol (TCP), a User Datagram Protocol (UDP) and so forth, as examples. The flow tuple 140 may include a field 142 that indicates an Internet Protocol (IP) destination address (i.e., the address of the device to receive the packet); a field 144 that indicates an IP source address (i.e., the address of a device to transmit the packet); a field 146 that indicates a TCP destination port (i.e., the address of the application that caused generation of the packet); a field 148 that indicates a TCP source port (i.e., the address of the application that is to receive the packet); a field 150 that indicates security/authentication attributes of the packet; and an SPI field 152. Other fields may be included in a flow tuple 140. Other flow tuples 140 may be associated with other network protocols, such as UDP, for example.

Referring again to FIG. 3, the transmit path 94 of the network controller 52 may include a transmit parser 114 that is coupled to the system bus interface 130 to receive outgoing packet data from the device 50 and form the header on the packets. To accomplish this, in some embodiments, the transmit parser 114 stores the headers of predetermined flows in a header memory 116. Because the headers of a particular flow may indicate a significant amount of the same information (port and IP addresses, for example), the transmit parser 114 may slightly modify the stored header for each outgoing packet and assemble the modified header onto the outgoing packet. As an example, for a particular flow, the transmit parser 114 may retrieve the header from the header memory 116 and parse the header to add such information as sequence and acknowledgment numbers (as examples) to the header of the outgoing packet. A checksum engine 120 may compute checksums for the IP and network headers of the outgoing packet and incorporate the checksums into the packet.

The transmit path 94 may also include the cryptographic engine 126 that may encrypt and/or authenticate the data of the outgoing packets. In this manner, all packets of a particular flow may be encrypted and/or authenticated with a key that is associated with the flow, and the keys for the different flows may be stored in a key memory 124. As noted above, the cryptographic keys are based on the cryptographic algorithms used.

In some embodiments, new keys may be added to the key memory 124 and existing keys may be modified or deleted by information passed through the transmit path 94 in fields of a control packet. The transmit path 94 may also include one or more FIFO memories 122 to synchronize the flow of the packets through the transmit path 94. A parallel-to-serial conversion circuit 128 may be coupled to the FIFO memory (ies) 122 to retrieve packets that are ready for transmission for purposes of serializing the data of the outgoing packets. Once serialized, the circuit 128 may pass the data to the network interface 90 for transmission to the network 47.

Figure 5:
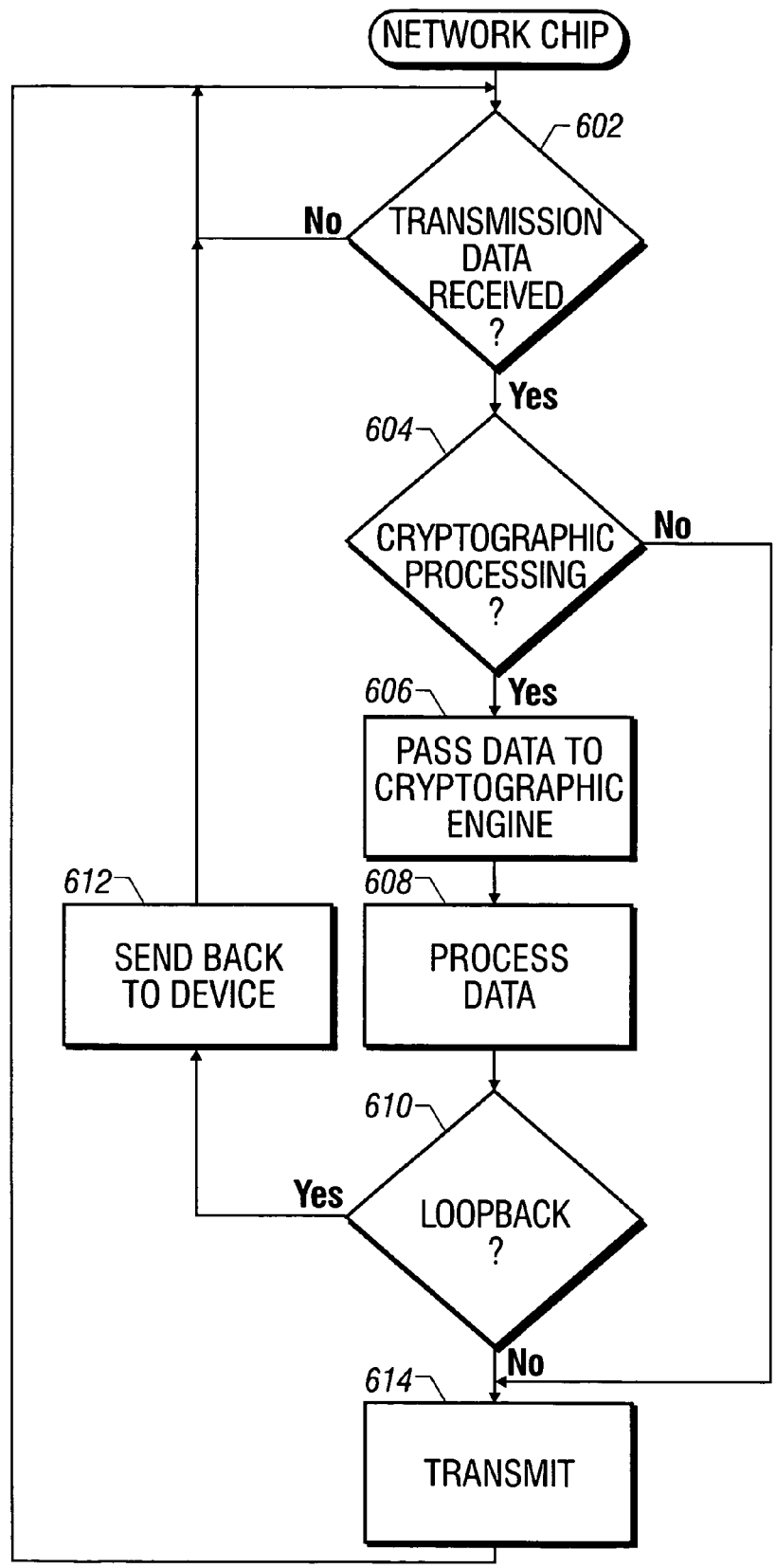
FIG. 5 is a flow diagram of a security process according to an embodiment performed by the network controller of FIG. 3.

Referring to FIG. 5, the security operations of the network controller 52 are illustrated. Once a datagram to be transmitted is received (at 602), the transmit parser 114 accesses the security control information and commands of the IPSEC packet to determine if cryptographic processing is to be employed. If the security information and commands indicate that no security protocol is implemented (at 604), then the transmit parser 114 passes the datagram to a queue 122, which is forwarded (at 614) to the network interface 90 for transmission to the network 47. In this case, the cryptographic engine 126 is bypassed.

If security services are requested based on the security control information and commands (at 604), then the associated key or keys are retrieved from the key memory 124 and passed along to the cryptographic engine 126 (at 606) to perform encryption and authentication operations. If the key or keys are unavailable in the key memory 124, then the network controller 52 may access another storage location outside the network controller 52 to retrieve the key or keys, as further described below. According to some embodiments, various types of encryption algorithms may be indicated by the security control information of the IPSEC packet, such as symmetric encryption algorithms including block ciphers or stream ciphers, public key algorithms, and others. Authentication algorithms may include the following examples: keyed message authentication codes (MACs) based on a symmetric encryption algorithm such as the data encryption standard (DES); one-way hash functions such as a message digest function (MD5) or a secure hash algorithm (SHA); or others. Descriptions of MACs, DES, MD5, and SHA may be found in Bruce Schneier, "Applied Cryptography," John Wiley & Sons, Inc. (2d Ed. 1996).

The cryptographic engine 126 then processes the data (at 608) for encryption and authentication based on the type or types of algorithms to be employed and keys retrieved from the key memory 124 (FIG. 3). The cryptographic engine 126 next determines (at 610) whether loopback mode is invoked, in which cryptographically processed data is routed back (at 612) to the receive path 92 over link 127 (FIG. 3). The data is sent back to the other layers (e.g., the security routines 410 and 411) of the device 50 for further processing. This may be determined based on information contained in the ESP or AH header of the IPSEC packet. Loopback mode may be used for a number of reasons, including datagrams that use nested SAs that employ multiple passes through the cryptographic engine 126 to complete the cryptographic process. Multiple nested SAs may be used if more than one security protocol is to be applied to a datagram such as combining the AH and ESP protocols or by use of IP tunneling.

The loopback feature may also be used by application processes (secondary use processes, such as process 405) in the device 50 on data that are not transmitted over the network 47. For example, data from the application process 405 may be transmitted or received through some other interface in the device 50, such as a modem or other transceiver 75 coupled to an expansion bus 70 or another bus. Such data may also need to be cryptographically processed. Instead of performing the cryptographic operations using the main processor 54 or another coprocessor, the operations may be performed by the cryptographic engine 126 in the network controller 52.

The loopback feature may also be used when a received datagram is not recognizable based on the stored flow tuples 140 in the SPD 522. Such a datagram is passed on up through the receive path 92 to a higher layer, such as the security routines 410 and 411. The security routines 410 and 411 can then determine how to further process the received datagram. For example, in the embodiment in which only a portion of the SAD 520 is available in the network controller 52, the security routines 410 and 411 can access the full SAD in the device to determine the SA of the received data. If the security routines 410 and 411 are successful in determining the SA, then the SAD portion 520 in the network controller 52 can be updated and the data and related security information may be sent back to the network controller 52 for cryptographic processing.

The security routines 410 and 411 may also have other capabilities, such as preventing a replay attack. To implement such other capabilities, the security routines 410 and 411 may utilize the loopback feature to perform cryptographic processing as many times as needed.

If loopback is not employed, as determined at 610, then the data processed by the cryptographic engine 126 is forwarded (at 614) for transmission by the network interface 90.

Referring again to FIG. 3, the receive parser 98 in the receive path 92 may use the stored flow tuples 140 to determine if a received packet needs to be cryptographically processed according to a specified security protocol. In the receive path of a network controller 52 according to some embodiments, a receive parser 98 may compare information in a received datagram with a subset of a flow tuple 140 (FIG. 6) stored in the memory 100 to identify the SA of the datagram. For example, in some embodiments, the receive parser 98 may use the fields 142, 150 and 152 (the destination IP address; the IPSEC protocol (AH or ESP); and the SPI value) to identify a flow tuple hit so that the SA of the incoming datagram can be determined. If a flow tuple hit occurs, the flow tuple information is used to map into the SAD 520C to determine the SA of the data.

Additional flow tuples 140 may be stored in the memory 100 and existing flow tuples 140 may be removed from the memory 100 by the network device driver 408. In some embodiments, the memory 100 may also store information fields 141. Each field 141 may be associated with a particular flow tuple 140 and may indicate, for example, a handler that identifies (for the network protocol stack) the flow and a pointer to a buffer of a system memory 56, as further described below.

If the receive parser 98 recognizes (by the flow tuples 140) the flow that is associated with the incoming packet, then the receive path 92 may further process the packet. In some embodiments, the receive parser 98 may indicate (to other circuitry of the network controller 52 and eventually to a network protocol stack) recognition of the flow associated with a particular packet and other detected attributes of the packet.

If the receive parser 98 does not recognize the flow, then the receive path 92 marks the packet as punted and passes the incoming packet over a system bus interface 130 to the security routines 410 and 411 for processing, as described above.

In some embodiments, once the SA of the incoming packet is determined, the associated key or keys may be retrieved from the key memory 104 so that the cryptographic engine 102 can perform its cryptographic operations. The keys in the key memory 104 are indexed by the SA of the received data.

Keys may be added to or removed from the key memory 104 by the network device driver 408. In this manner, if the engine 102 determines that the particular decryption key is not stored in the key memory 104, then the engine 102 may submit a request (over the system bus interface 130) to the device driver 408 (see FIG. 2) for the key. In this manner, the device driver 408 may cause the processor 54 to furnish the key in response to the request and interact with the system bus interface 130 to store the key in the key memory 104. In some embodiments, if the key is unavailable (i.e., the key is not available from the device driver 408 or is not stored in the key memory 104), then the engine 102 does not decrypt the data portion of the packet. Instead, the system bus interface 130 stores the encrypted data in a predetermined location of the system memory 56 (see FIG. 2) so that software of one or more layers of the protocol stack may be executed to decrypt the data portion of the incoming packet, as discussed above.

After parsing has been performed, the processing of the packet by the network controller 52 may include bypassing the execution of one or more software layers that are associated with the network protocol stack. For example, the receive path 92 may include a zero copy parser 110 that, via the system bus interface 130, may copy data associated with the packet into a memory buffer that is associated with an application process. In addition, the zero copy parser 110 may handle control issues between the network controller 52 and the protocol stack and may handle cases where an incoming packet is missing, as described below.

The receive path 92 may also include one or more first-in-first-out (FIFO) memories 106 to synchronize the flow of incoming packets through the receive path 92. A checksum engine 108 (of the receive path 92) may be coupled between the FIFO memory(ies) 106 and the system bus interface 130 for purposes of verifying checksums that are embedded in the packets.

The receive path 92 may be interfaced to the system bus 72 over the system bus interface 130. The system bus interface 130 may include an emulated direct memory access (DMA) engine 131 that is used for purposes of transferring the data portions of the packets directly into the main memory 56.

In some embodiments, the receive path 92 may include additional circuitry, such as a serial-to-parallel conversion circuit 96 that may receive a serial stream of bits from a network interface 90 when a packet is received from the network 47. In this manner, the conversion circuit 96 packages the bits into bytes and provides these bytes to the receive parser 98. The network interface 90 may be coupled to generate and receive signals to and from the network 47.

Figure 7:
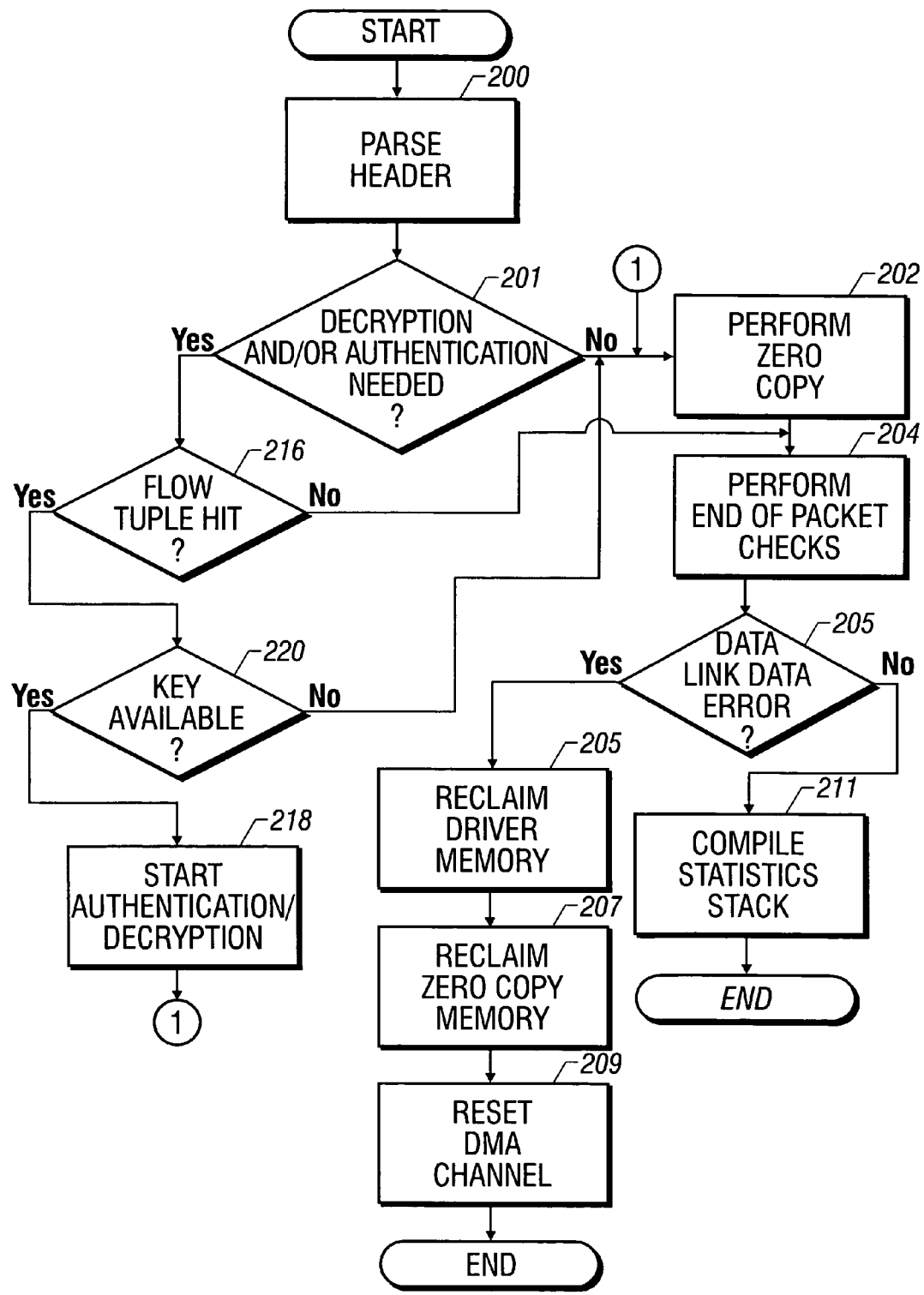
FIG. 7 is a flow diagram illustrating parsing of packet data by a receive parser of the network controller of FIG. 5.

Referring to FIG. 7, a flow of operations in response to receipt of a packet over the network 47 in the network controller 52 is illustrated. The receive parser 98 may parse (at 200) the header of each incoming packet. From the parsed information, the receive parser 98 may determine if the packet (e.g., an IPSEC packet) is associated with some security protocol (at 201).

If authentication or decryption is needed, then the receive parser 98 may use the parsed information from the header to determine (at 216) if a flow tuple hit has occurred to enable determination of the associated SA. If not, the receiver parser 98 transfers control to the zero copy parser 110 that performs end of packet checks (at 202). Otherwise, the receive parser 98 determines (at 220) if the key pointed to by the SA is available in the key memory 104. If the key is available, then the receive parser 98 may start authentication and/or decryption of the packet (at 218) before passing control to the zero copy parser 110 that may perform a zero copy of the packet (at 202). If the key is not available, the receive parser 98 may transfer control to the zero copy parser 110 to perform a zero copy operation (at 202).

After performing the zero copy operation (at 202), the zero copy parser 110 may perform end of packet checks (at 204). In these checks, the receive parser 98 may perform checks that typically are associated with the data link layer. For example, the receive parser 98 may ensure that the packet indicates the correct Ethernet MAC address, no cyclic redundancy check (CRC) errors have occurred, no receive status errors (collision, overrun, minimum/maximum frame length errors, as examples) have occurred and the length of the frame is greater than a minimum number (64, for example) of bytes. The receive parser 98 may perform checks that typically are associated with the network layer. For example, the receive parser 98 may check on the size of the IP packet header, compute a checksum of the IP header, determine if the computed checksum of the IP header is consistent with a checksum indicated by the IP header, ensure that the packet indicates the correct IP destination address and determine if the IP indicates a recognized network protocol (the TCP or UDP protocols, as examples).

The receive parser 98 may also perform checks that are typically associated with functions that are performed by the processor's execution of software that is associated with the transport layer. For example, the receive parser 98 may determine if the size of the protocol header is within predefined limits, may compute a checksum of the protocol header, and may determine if flags called ACK, URG, PSH, RST, FIN and/or SYN flags are set. If the PSH flag is set, then the receiver parser 98 may indicate this event to the driver program. If the RST, FIN or SYN flags are set, the receive parser 98 may surrender control to the transport layer. If the ACK flag is sent, then the receive parser 98 may interact either with the device driver 408 or the transmit path 94 to transmit an acknowledgment packet, as further described below.

After the checks are complete, the zero copy parser 110 may determine (at 205) whether a data link error occurred, an error that may cause the packet to be unusable. If this is the case, then the zero copy parser 110 may reclaim (at 205) the memory that the driver program allocated for the packet, reclaim (at 207) the memory that was allocated for zero copy of the packet and reset (at 209) the DMA channel (emulated by the DMA engine 131) that was associated with the packet. Otherwise, the zero copy parser 110 compiles an error statistics stack for the protocol stack.

Referring back to FIG. 2, besides the network controller 52, the computer system 50 may include the processor 54 that is coupled to a host bus 58. The host bus 58 may be coupled by a bridge, or memory hub 60, to an Accelerated Graphics Port (AGP) bus 62, as described in the Accelerated Graphics Port Interface Specification, Revision 2.0, dated May 1998. The AGP bus 62 may be coupled to, for example, a video controller 64 that controls a display 65. The memory hub 60 may also couple the AGP bus 62 and the host bus 58 to a memory bus 61. The memory bus 61, in turn, may be coupled to a system memory 56 that may, as examples, store the buffers 304 and a copy of the device driver 408.

The memory hub 60 may also be coupled (via a hub link 66) to another bridge, or input/output (I/O) hub 68, that is coupled to an I/O expansion bus 70 and the system bus 72. The I/O hub 68 may also be coupled to, as examples, a compact disc (CD) or digital video disc (DVD) drive 82 and a hard disk drive 84. The I/O expansion bus 70 may be coupled to an I/O controller 74 that controls operation of a floppy disk drive 76 and receives input data from a keyboard 78 and a mouse 80, as examples.

Various software or firmware (formed of modules, routines, or other layers, for example), including applications, operating system modules or routines, device drivers, BIOS modules or routines, and interrupt handlers, may be stored or otherwise tangibly embodied in one or more storage media in the device 50 and other like devices. Storage media suitable for tangibly embodying software and firmware instructions may include different forms of memory including semiconductor memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as CD or DVD disks. The instructions stored in the storage media when executed cause the device 50 to perform programmed acts.

The software or firmware can be loaded into the device 50 in one of many different ways. For example, instructions or other code segments stored on storage media or transported through a network interface card, modem, or other interface mechanism may be loaded into the device 50 and executed to perform programmed acts. In the loading or transport process, data signals that are embodied as carrier waves (transmitted over telephone lines, network lines, wireless links, cables and the like) may communicate the instructions or code segments to the device 50.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use in a device coupled to a communications channel, comprising:
   determining a security service to perform with a data block;
   generating security information to pass along with the data block, the security information identifying the security service;
   using a computer peripheral device adapted to control communication with the communications channel to select the security service from other security services based on the security information; and
   processing, in the computer peripheral device, the data block according to the security information.

2. The method of claim 1, wherein the processing includes performing cryptographic processing of the data block.

3. The method of claim 1, further comprising:
   receiving the data block from a software routine; and
   routing the processed data block back to the software routine after processing.

4. The method of claim 1, further comprising:
   determining if the security service can be performed by the computer peripheral device; and
   if not, processing the data block according to the security service in a software routine instead of the computer peripheral device.

5. The method of claim 1, further comprising identifying a security service according to an Internet Protocol security protocol.

6. A controller for controlling communications with a transport medium, the controller comprising:
   a receiving circuit to receive data and associated security control information, the security control information identifying a security service to be performed on the data; and
   a cryptographic engine to select the security service from other security services based on the security control information and cryptographically process the data based on the selection, the cryptographic engine being a computer peripheral device.

7. The controller of claim 6, further comprising a storage device containing information identifying security services to be performed, the received security control information selecting a portion of the security services information in the storage device, wherein the cryptographic engine processes the data according to the selected portion of the security services information.

8. The controller of claim 7, further comprising a device adapted to change the contents of the storage device to update the security services information.

9. The controller of claim 8, wherein the device is adapted to update the security services information based on a predetermined replacement policy.

10. The controller of claim 7, wherein the security services information includes security association information.

11. A method for use in a device coupled to a communications channel, comprising:
    determining a security service to perform with a data block;
    generating security information to pass along with the data block, the security information identifying at least one of an encryption algorithm and an authentication algorithm to be performed by the security service; and
    processing, in a computer peripheral device adapted to control communication with the communications channel, the data block according to the security information.

12. The method of claim 11, wherein the processing includes performing cryptographic processing of the data block.

13. The method of claim 11, further comprising:
    receiving the data block from a software routine; and
    routing the processed data block back to the software routine after processing.

14. The method of claim 11, further comprising:
    determining if the security service can be performed by the computer peripheral device; and
    if not, processing the data block according to the security service in a software routine instead of the computer peripheral device.

15. The method of claim 11, further comprising identifying a security service according to an Internet Protocol security protocol.

16. A controller for controlling communications with a transport medium, the controller comprising:
    a receiving circuit to receive data and associated security control information, the security control information identifying at least one of an encryption algorithm and an authentication algorithm to be performed on the data; and
    a cryptographic engine to cryptographically process the data based on the security control information, the cryptographic engine being a computer peripheral device.

17. The controller of claim 16, further comprising a storage device containing information identifying security services to be performed, the received security control information selecting a portion of the security services information in the storage device, wherein the cryptographic engine processes the data according to the selected portion of the security services information.

18. The controller of claim 17, further comprising a device adapted to change the contents of the storage device to update the security services information.

19. The controller of claim 18, wherein the device is adapted to update the security services information based on a predetermined replacement policy.

20. The controller of claim 17, wherein the security services information includes security association information.

* * * * *